United States Patent [19]

Riedel

[11] 3,977,775

[45] Aug. 31, 1976

[54] DAMPER FOR MOTION PICTURE FILM IN CINEMATOGRAPHIC APPARATUS

[75] Inventor: Wolfgang Riedel, Winnenden, Germany

[73] Assignee: Robert Bosch G.m.b.H., Stuttgart, Germany

[22] Filed: Aug. 13, 1975

[21] Appl. No.: 604,334

[30] Foreign Application Priority Data

Sept. 3, 1974  Germany............................ 2442148

[52] U.S. Cl................................ 352/159; 226/114; 226/195
[51] Int. Cl.².......................................... G03B 1/56
[58] Field of Search.................... 352/159, 157, 158; 226/114, 195, 44, 45

[56] References Cited
UNITED STATES PATENTS

| | | |
|---|---|---|
| 1,282,437 | 10/1918 | Krug .................................. 352/159 |
| 3,870,406 | 3/1975 | Nebbia ............................... 352/159 |

*Primary Examiner*—Monroe H. Hayes
*Attorney, Agent, or Firm*—Michael J. Striker

[57] ABSTRACT

An elastic damper which engages the film between the supply reel and the film gate of a motion picture projector has an elongated first leg which loops the film and is pivotable with respect to a second leg which is reciprocable between bridges and is biased forwardly so as to urge the first leg against the film. When the tension of film fluctuates within a normal range, such as is attributable to intermittent operation of the pull-down, the first leg merely pivots while the second leg remains stationary. If the tension of film increases so that the pivotal movement of the first leg is more pronounced, the second leg is shifted against spring bias to effect a reduction of the size of the loop. This insures that the inclination of the film portion between the gate and the first leg remains substantially unchanged.

14 Claims, 3 Drawing Figures

DAMPER FOR MOTION PICTURE FILM IN CINEMATOGRAPHIC APPARATUS

BACKGROUND OF THE INVENTION

The present invention relates to cinematographic apparatus in general, especially to motion picture projectors, and more particularly to improvements in elastic compensating members or dampers which are utilized in such apparatus to engage motion picture film intermediate a continuously rotating device (such as the supply reel in a motion picture projector) and a device (such as the film gate in a projector) where the film is advanced stepwise or intermittently, normally by the claw of a pulldown or intermittent.

Presently known dampers between the supply reels and film gates of motion picture projectors operate satisfactorily as long as the film coming from the core of the supply reel offers a predictable constant resistance to forward movement under the action of the pull-down. As a rule, a conventional damper is fully capable of compensating for the fact that the supply reel rotates continuously whereas the pull-down advances the film stepwise so that each film frame is at a stand still during the interval of projection of its image onto a screen or the like. To this end, the damper undergoes repeated elastic deformation at one or two points, first as a result of increasing tension when the film is being pulled by the claw of the pull-down and thereupon due to its elasticity as the supply reel rotates by inertia while the pull-down performs a return stroke.

However, a conventional damper does not operate satisfactorily when the tension of film fluctuates for reasons other than the fact that the pull-down draws the film intermittently off a continuously rotating supply reel. For example, the tension of motion picture film will fluctuate often within a rather wide range, if the core of a supply reel carries a large roll of convoluted film and the supply reel is out of round or rotates with a certain amount of radial and/or axial play. The just mentioned unpredictable random fluctuations of the film tension result in the generation of noise and in blurring of projected images because the frames are not in exact register with the gate during projection of their images onto a screen.

It was already proposed to utilize additional or auxiliary dampers which are intended to compensate for randomly developing and unpredictable changes in tension of motion picture film between the supply reel and the film gate of a motion picture projector. However, the characteristic vibration of such auxiliary dampers is different from that of customary elastic dampers. Therefore, whenever an auxiliary damper becomes effective (i.e., when the tension of film changes for one or more reasons other than stepwise film transport by the pull-down), it is likely to affect the characteristic of the customary damper and/or to exert an adverse influence directly upon the motion picture film. Moreover, the manufacture, mounting, maintenance and inspection of auxiliary dampers contribute to space requirements as well as coat of cinematographic apparatus.

SUMMARY OF THE INVENTION

An object of the invention is to provide a cinematographic apparatus wherein a single damper can compensate for any and all changes in tension of motion picture film, especially for such changes in tension which develop between the supply reel and the film gate of a motion picture projector.

Another object of the invention is to provide a simple, compact, inexpensive and rugged multiple-purpose damper for use between the supply reel and the film gate of a motion picture projector.

A further object of the invention is to provide a damper which can compensate for predictable as well as randomly occuring fluctuations of film tension in a cinematographic apparatus.

An additional object of the invention is to provide novel and improved means for supporting and guiding the above outlined damper in the housing of a motion picture projector.

Another object of the invention is to provide a single damper which can form part of two different vibratory systems having different vibration characteristics.

The invention is embodied in a cinematographic apparatus, particularly in a motion picture projector. The apparatus comprises a support (e.g., the housing of a motion picture projector), a supply reel or an analogous source of motion picture film which is mounted in or on the support for rotation about a predetermined axis, a pull-down or analogous means for intermittently withdrawing film from the source whereby the source rotates and the tension of film intermediate the source and the withdrawing means fluctuates within a relatively narrow range as a result of intermittent withdrawal of film as well as randomly or unpredictably within a relatively wide range (for example, such random fluctuations of film tension within a relatively wide range can occur in response to stray movements of the source with respect to its axis, especially when the source carries a relatively large roll of convoluted motion picture film), and an at least partly elastic damper having a first section (e.g., one leg of a strip-shaped metallic or plastic compensating member) which engages and loops the film intermediate the source and the withdrawing means and a second section which may be integral with or is connected to the first section through the medium of a further or intermediate section. The first section is movable relative to the second section to compensate for fluctuations of film tension within the relatively narrow range (for example, the first section can be flexed in the region where it merges into the second section or where it merges into the aforementioned intermediate section).

The apparatus further comprises guide means which is provided in or on the support and serves to normally confine the second section to movement in first and second directions to thereby respectively increase and reduce the size of the loop which is formed by the first section inermediate the source and the withdrawing means, and means for biasing the second section in the first direction. The first section is further movable relative to the second section to compensate for fluctuations of film tension within the relatively wide range, with attendant movement of the second section in the second direction against the opposition of the biasing means. Thus, the biasing means can be designed to prevent any (or to allow minimal) movements of the second section in the second direction when the first section is moved by film as a result of fluctuations of film tension within the narrow range, but the biasing means yields when the tension of film increases to thereby allow for movement of the first section in a direction to reduce the size of the loop.

The guide means may comprise several bridges which engage the second section from opposite sides and at least some of which have means for flanking the marginal portions of the preferably flat second section. The biasing means may comprise a helical or oher spring which is directly or indirectly coupled to the second section or a further section of the damper which is elastic and bears against a stationary stop to thereby urge the first section against the film through the intermediary of the second section.

The novel features which are considered as characteristic of the invention are set forth in particular in the appended claims. The improved damper itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
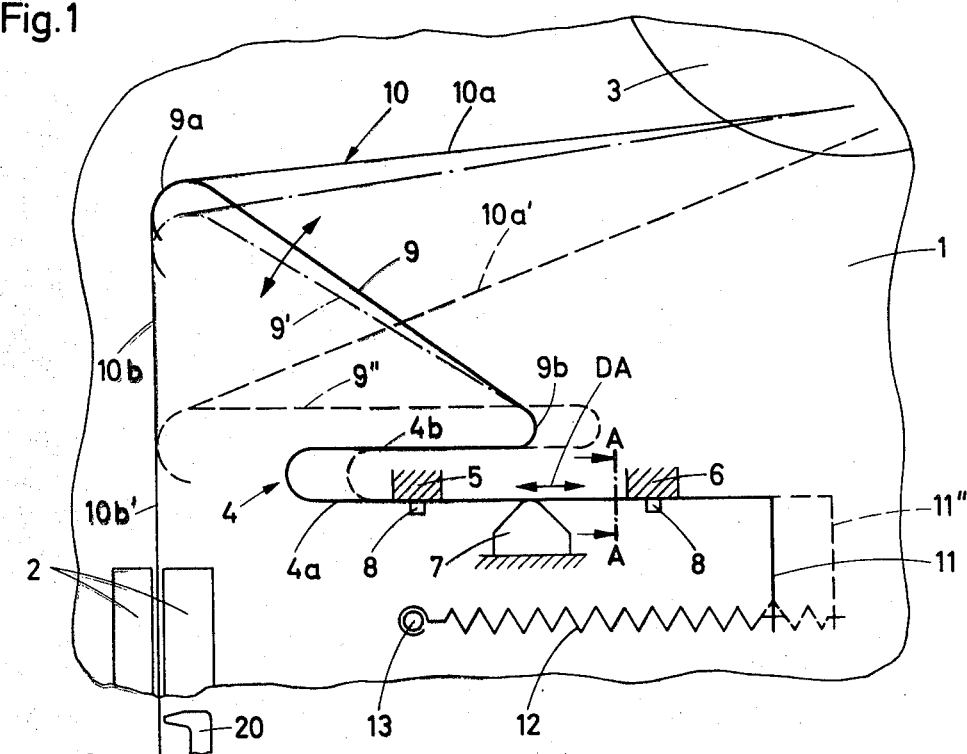
FIG. 1 is a fragmentary schematic partly elevational and partly sectional view of a motion picture projector including a substantially S-shaped damper which is constructed and mounted in accordance with a first embodiment of the invention.
Figure 2:
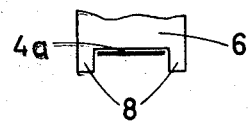
FIG. 2 is a sectional view as seen in the direction of arrows from the line A—A of FIG. 1.

Referring first to FIG. 1, there is shown a portion of a motion picture projector having a housing 1 which supports a source 3 (e.g., a conventional supply reel) of motion picture film 10 and a film gate 2 in line with the optical and illuminating systems, not shown. The housing 1 further supports novel guide means for an elastic compensating member or damper 4 which engages and normally loops the film 10 intermediate the supply reel 3 and the gate 2. The guide means allows a substantially straight elongated section or lower leg 4a of the damper 4 to reciprocate in directions indicated by a double-headed arrow DA. In the embodiment of FIG. 1, the guide means comprises three abutments or bridges 5, 6 and 7. The bridges 5, 6 are mounted in the housing 1 at the upper side and the bridge 7 is mounted in the housing 1 at the underside of the leg 4a intermediate the bridges 5 and 6. It will be noted each of the bridges 5–7 is open at that side which faces the leg 4a. At least two of the bridges 5–7 have pairs of lateral protuberances or lugs 8 (see also FIG. 2) which flank the marginal portions of the leg 4a. As shown in FIG. 1, the lugs 8 can be provided on the bridges 5 and 6; they confine the leg 4a to movement in the directions indicated by arrow DA, i.e., the leg 4a cannot swivel or turn about the tip of the bridge 7 in a plane which is normal to the plane of FIG. 1.

The damper 4 consists of elastomeric metallic or plastic strip stock and includes the aforementioned lower leg 4a, a substantially straight intermediate section or leg 4b which is bent over and is substantially parallel with the leg 4a, and an upwardly and forwardly inclined straight upper section or leg 9 having a suitably curved film-engaging portion 9a. The film 10 is looped by the portion 9a so that the film portion 10a between the supply reel 3 and the leg 9 normally makes an obtuse angle, a right angle, or a relatively large acute angle with the film portion 10b between the leg 9 and film gate 2. The intermediate leg 4b is desirable in order to impart to the damper 4 the shape of the letter S and to increase the length of the leg 9. The rear end portion of the lower leg 4a constitutes a downwardly projecting extension 11 which is connected with one end convolution of a yieldable biasing means here shown as a helical spring 12. The other end convolution of the spring 12 is connected to a post 13 in the housing 1, and the spring tends to move the leg 4a forwardly so that the portion 9a of the leg 9 bears against the film 10.

The damper 4 can be flexed at several points, especially in the region of the curved portion 9b between the legs 9 and 4b as well as in the region of a similar curved portion between the legs 4a, 4b.

When the motion picture projector is in use, the takeup reel (not shown) collects the film 10 downstream of the film gate 2 and the customary pull-down or intermittent 20 places successive film frames into register with the optical system of the projector. As the pull-down performs its working strokes, it draws the film 10 off the core of the supply reel 3 by way of the straight leg 9 of the damper 4. In normal operation, stepwise transport of film 10 by the claw of the pull-down 20 results in repeated flexing of the damper 4 in the region (9b) where the leg 9 meets the intermediate leg 4b whereby the leg 9 moves between the solid-line position and the phantom-line position 9' of FIG. 1. Thus, the leg 9 moves relative to the legs 4a, 4b to compensate for such fluctuations of film tension (within a relatively narrow range) which develop as a result of intermittent withdrawal of film from the source or supply reel 3.

If the tension of film 10 between the takeup reel 3 and the gate 2 increases (for example because the resistance which the reel 3 offers to rotation in a direction to pay out the film increases, because a convolution of film "sticks" between the flanges of the reel 3, or because the reel 3 performs stray movements with respect to the axis of its shaft or spindle), the film flexes the damper 4 to a greater extent so that the leg 9 can assume, under certain circumstances, the position 9" which is indicated by broken lines. Such pivoting of the leg 9 beyond the position 9' entails a movement of the entire damper 4 in a direction to the right, as viewed in FIG. 2, so that the extension 11 moves to the broken-line position 11" and stresses the spring 12. In other words, the leg 4a slides between the lugs 8 and along the tip of the median bridge 7 so as to move away from the gate 2 when the tension of film fluctuates within a relatively wide range which suffices to enable the leg 9 to push the leg 4a in a direction to effect a reduction of the size of the loop which is formed by the curved portion 9a.

The tensional stresses in the film portions 10a, 10b upstream and downstream of the portion 9a of the leg 9 are substantially identical. Thus, when the leg 9 assumes the solid line position of FIG. 1, the resultant of such stresses halves the angle between the film portions 10a and 10b and makes a rather pronounced acute angle with the longitudinal direction of the leg 4a. When the tension increases, the resultant of stresses acting in film portions 10a', 10b' halves the the angle therebetween and makes a much smaller acute angle with the longitudinal direction of the leg 4a. In other words, as the leg 9 is caused to pivot from the solid-line position toward the broken-line position 9", the direction of the resultant of forces acting on the portion 9a moves closer toward a position of parallelism with the leg 4a. This means that the force which tends to shift the leg 4a against the opposition of the spring 12 increases proportionally or substantially proportionally with increasing tension of film between the reel 3 and gate 2. Thus, progressing pivoting of the leg 9 from its normal (solidline) position brings about a more pronounced shifting of the leg 4a against the resistance of the spring 12, and the damping effect of the member 4 increases accordingly. Otherwise stated, more pronounced fluctuations of tension in the film 10 between the reel 3 and gate 2 are progressively compensated for by more pronounced sliding of the leg 4a along the path defined by the bridges 5–7 and in a direction to reduce the size of the loop between the reel 3 and pull-down 20.

The improved damper 4 can be installed in or removed from the housing 1 with a minimum of effort and with little loss of time. Thus, in order to install the damper 4, the person in charge simply flexes the elastic leg 4a so that it can be placed over the tip of the median bridge 7 and can bypass the lower ends of the lugs 8, and the flexing stress is thereupon terminated so that the end portions of the leg 4a enter the spaces between the respective pairs of lugs 8 due to innate tendency of the leg 4a to assume the position shown in FIG. 1. The extension 11 is thereupon coupled to the spring 12 and the damper 4 is ready to engage the film 10 as soon as the latter is threaded through the projector so that it extends from the core of the supply reel 3, over the portion 9a of the leg 9, through the gate 2, over another loop former (not shown) and to the core of the takeup reel.

The damper of FIG. 1 can be modified by placing the bridges 5–7 adjacent to the path of movement of the intermediate section or leg 4b. The leg 4a can be omitted if the bridges 5–7 guide the leg 4b. The sections or legs 4a, 4b, 9 are preferably straight and are connected to each other by arcuate portions such as that shown at 9b.

The bridges 5–7 may but need not maintain the leg 4a in slightly stressed condition; slight stressing reduces the likelihood of accidental shifting or other undesired movements of the leg 4a with respect to the guide means. It will be noted that, when the leg 9 is pivoted by the film 10 so as to move nearer to a position of parallelism with the leg 4a, the elastic leg 4a tends to move away from the bridge 5 and is flexed at the tip of the bridge 7.

Figure 3:
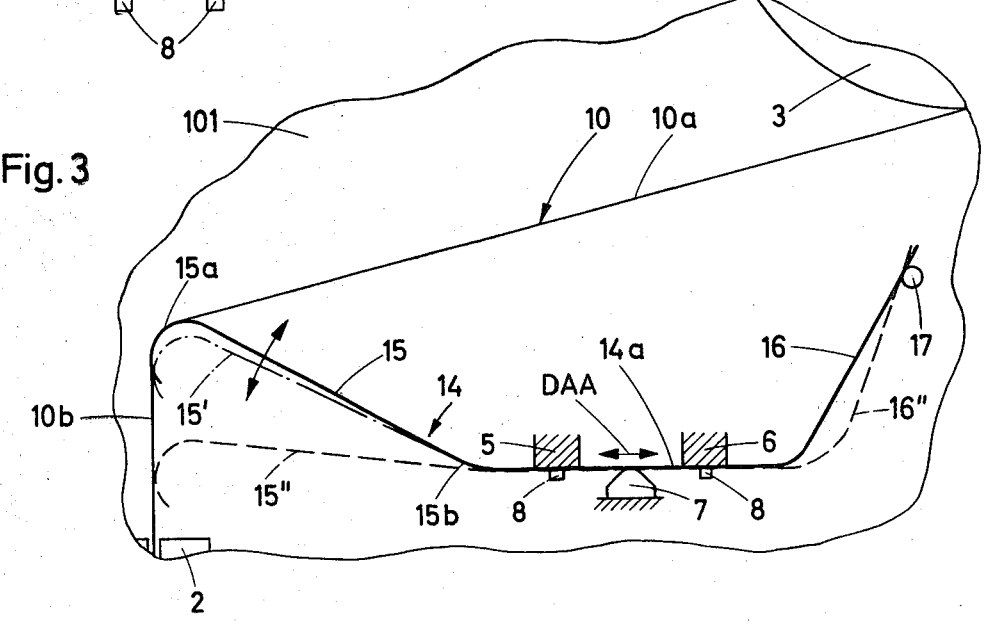
FIG. 3 is a fragmentary schematic partly elevational and partly sectional view of a motion picture projector including a damper which embodies a second form of the invention.

FIG. 3 shows a modified damper 14 having a median section or leg 14a which corresponds to the leg 4a of the damper 4 and is guided by three bridges 5, 6, 7 and by two pairs of lugs 8 in the same way as described in connection with the damper 4, a rear section or leg 16 which can be said to correspond to the extension 11 of the leg 4a plus the spring 12, and a third section or leg 15 having a curved film-engaging portion 15a. The leg 16 has an end portion which is remote from the leg 14a and bears against a stationary stop 17 in the housing 101. The damper 14 and its mounting means are simpler than those shown in FIG. 1 because the structure of FIG. 3 dispenses with a discrete biasing means (spring 12 of FIG. 1); instead, the innate elasticity of the damper 14 insures that the portion 15a of the leg 15 is invariably urged against and loops the film 10 between the supply reel 3 and the gate 2. The leg 15 can be pivoted in the region 15b where it merges directly into the front end of the leg 14a so that it can move between the solid-line position, the phanton-line position 15' and the brokenline position 15" of FIG. 3. The positions 15' and 15" respectively correspond to the positions 9' and 9" of the leg 9 shown in FIG. 1. The leg 16 can be said to constitute a leaf spring.

The operation of the projector including the damper 14 of FIG. 3 is clearly analogous to that of the projector shown in FIG. 1. As the tensional stresses in the film portions 10a and 10b increase, the inclination of the resultant of such stresses changes in a direction to approach more closely a direction which is parallel to the direction of reciprocatory movement of the leg 14a (see the double-headed arrow DAA).

The mounting of the damper 14 in the housing 101 is even simpler than that of the damper 4 because the leg 14a and/or 16 need not be connected to a discrete spring; instead, the leg 16 is simply pivoted relative to the leg 14a so that its free end portion bears against the front side of the stop 17. The broken-line position 16" of the leg 16 corresponds to the position 11" of the extension 11 shown in FIG. 1.

Both embodiments of the damper exhibit the advantage that the damper acts as a spring of a first vibratory or oscillating system which includes the damper and the film while the leg 9 or 15 moves back and forth between the solid-line position and the position 9' or 15' as well as a spring of a second vibratory system which includes the damper and the film while the leg 9 or 15 moves between the solid-line position and (or even beyond) the position 9" or 15".

Another advantage of the improved damper and its guide means and biasing means is that the leg 9 or 15 always remains in or very close to the general plane of the film gate 2, irrespective of the extent to which the leg 9 or 15 is pivoted by the film intermediate the supply reel 3 and the pull-down 20. When the tension of the film exceeds the afore-discussed relatively low range (i.e., when the leg 9 or 15 is caused to move beyond the position 9' or 15'), the entire damper 4 or 14 simply moves in a direction away from the film so that the size of the loop formed by the portion 9a or 15a decreases. This insures that the path of the film portion 10b' coincides with the path of the film portion 10b in each and every position of inclination of the leg 9 or 15. Such mode of operation is in contrast to operation of dampers which are fixedly mounted in the housing of a cinematographic apparatus and which are bound to be subjected to at least some lateral stresses when the tension of film is outside of a normal (relatively low) range such as is expected to develop as a result of intermittent withdrawal of film by the claw of the pull-down. The feature that the inclination of the film portion between the leg 9 or 15 and the gate 2 remains unchanged or changes only negligibly insures that each and every film frame is held in an optimum position with respect to the gate 2 when the pull-down 20 is disengaged from the film and begins to perform a return stroke. As mentioned above, the novel mode of compensating for relatively small as well as more pronounced fluctuations of film tension between the supply reel and the film gate further results in readily detectable reduction of noise when the projector is in use.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, particularly in a motion picture projector, a combination comprising a support; a source of motion picture film mounted in said support for rotation about a predetermined axis; means for intermittently withdrawing film from said source whereby said source rotates and the tension of film intermediate said source and said withdrawing means fluctuates within a relatively narrow range as a result of intermittent withdrawal of film as well as randomly within a relatively wide range, such as in response to stray movements of said source with respect to said axis; an at least partly elastic damper having a first section which engages and loops the film intermediate said source and said withdrawing means and a second section, said first section being movable relative to said second section to compensate for fluctuations of film tension within said relatively narrow range; guide means provided on said support for said second section, said second section being movable in said guide means in first and second directions to respectively increase and reduce the size of the loop which is formed by said first section; and means for biasing said second section in said first direction, said first section being further movable relative to said second section to compensate for fluctuations of film tension within said relatively wide range with attendant movement of said second section in said second direction against the opposition of said biasing means.

2. A combination as defined in claim 1, wherein said damper is substantially S-shaped and said sections thereof are substantially straight.

3. A combination as defined in claim 2, wherein said damper further comprises a third substantially straight section, one of said second and third sections being disposed intermediate said first section and the other of said second and third sections.

4. A combination as defined in claim 3, wherein said damper further comprises arcuate portions intermediate said sections thereof, said movements of said first section including pivoting of said first section in the region of the arcuate portion between said first section and said one section.

5. A combination as defined in claim 1, wherein said damper comprises an extension remote from said first section and said biasing means comprises a spring mounted in said support and attached to said extension to urge said second section in said first direction.

6. A combination as defined in claim 5, wherein said second section has an end portion remote from said first section and constituting said extension.

7. A combination as defined in claim 6, wherein said second section includes a substantially flat second portion which is inclined with respect to said extension and is reciprocably mounted in said guide means.

8. A combination as defined in claim 1, wherein said damper comprises a third section which is inclined with respect to said second section and said biasing means comprises stop means provided in said support and located in the path of movement of said third section under the action of film against said first section.

9. A combination as defined in claim 8, wherein said third section of said damper is elastic and said second section is located intermediate said first and third sections.

10. A combination as defined in claim 1, wherein said guide means comprises a plurality of bridges including spaced apart first and second bridges at one side and a third bridge at the other side of said second section, said third bridge being disposed intermediate said first and second bridges.

11. A combination as defined in claim 10, wherein said second section is elastic and said bridges cooperate to stress said second section.

12. A combination as defined in claim 10, wherein said movements of said first section in response to fluctuations of film tension tend to move said second section away from one of said first and second bridges and to flex said second section at said third bridge.

13. A combination as defined in claim 1, wherein said second section is reciprocable along a substantially straight path and said first section is pivotable with respect to said second section in response to fluctuations of film tension whereby the resultant of stresses which the tensioned film portions between said source and said first section on the one hand and said first section and said withdrawing means on the other hand transmit to said first section changes its inclination with respect to said path from a greater inclination to a less pronounced inclination in response to increasing tension of said film portions.

14. A combination as defined in claim 13, wherein said first section is normally inclined with respect to said second section and the extent of such inclination decreases as a result of pivoting of said first section in response to increasing tension of said film portions.

* * * * *